May 27, 1958  F. A. LIST, JR., ET AL  2,836,780
SINGLE-PHASE ELECTRIC MOTOR
Filed June 14, 1955

WITNESSES
Leon J. Taza
James F. Young

INVENTORS
Frederick A. List Jr. and
Robert W. Egglestone
BY
ATTORNEY

United States Patent Office 2,836,780
Patented May 27, 1958

2,836,780

SINGLE-PHASE ELECTRIC MOTOR

Frederick A. List, Jr., Buffalo, and Robert W. Egglestone, Checktowaga, N. Y., assignors to Westinghouse Electric Corporation, East Pittsburgh, Pa., a corporation of Pennsylvania Application June 14, 1955, Serial No. 515,416

5 Claims. (Cl. 318—220)

The present invention relates to single-phase induction motors and, more particularly, to reduction of the starting current of single-phase capacitor motors.

It is very desirable to reduce the starting current of a single-phase motor to as low a value as possible, but it has been a very difficult problem to obtain any substantial reduction in starting current without also reducing the starting torque below acceptable values. Many single-phase motors, especially those of the larger sizes, are used on lines, such as rural distribution lines, which have relatively poor line voltage regulation, and the high starting currents of conventional motors cause objectionable voltage fluctuations when the motor is started. In many locations, also, the utility companies limit the maximum starting current that can be drawn from the line by motors. These limitations on starting current have severely restricted the use of single-phase motors for many purposes, and have restricted the sizes of motors that can be used for particular applications or in particular locations. A material reduction in the starting current, without seriously affecting the starting torque, therefore, would greatly increase the field of usefulness of single-phase motors.

In conventional single-phase motors of the capacitor type, which are usually used where good starting torque is required, the starting current is fixed largely by the required pull-out torque of the motor. It is possible in these motors to obtain a small reduction in starting current by changing the value of the capacitor or the turn ratio between the main and auxiliary windings. If this is done, however, the starting torque decreases rapidly, so that the starting torque per unit current is quite low. Thus, if it is attempted to reduce the starting current in this manner, while meeting the pull-out torque requirements, the result is a motor in which the starting current is only slightly reduced but the starting torque is very low. For this reason, it is usually impractical to obtain any material reduction of the starting current in the design of a conventional capacitor motor. Other means that have been proposed heretofore for reducing the starting current have been unsatisfactory for the same reason; that is, any substantial reduction in starting current is accompanied by a corresponding or greater decrease in the starting torque.

The principal object of the present invention is to provide a single-phase induction motor of the capacitor type in which the starting current is greatly reduced, as compared to conventional motors, but in which the starting torque per unit current is high, so that the starting torque is sufficiently high for most applications.

Another object of the invention is to provide a single-phase capacitor motor in which the main and auxiliary primary windings are connected for starting in such a manner that the starting curent is greatly reduced without seriously affecting the starting torque, so that a motor is obtained which has low starting current and high starting torque per unit current.

A further object of the invention is to provide a single-phase capacitor motor having low starting current and having relatively simple control means for effecting the necessary changes in connections between the starting condition and the running condition, and having means for protecting the motor both during starting and running.

Other objects and advantages of the invention will be apparent from the following detailed description, taken in connection with the accompanying drawing, in which.

Single-phase induction motors have a main primary winding and an auxiliary primary winding which are physically displaced from each other, usually by ninety electrical degrees, on the primary member of the motor, which is usually the stator. In conventional capacitor motors, these windings are connected in parallel to a single-phase line for starting, with a capacitor in series with the auxiliary winding to produce a phase difference between the currents in the two windings, so that a starting torque is developed. When the motor has accelerated to the proper speed, the effective value of the capacitor may be changed for running, or the auxiliary winding and capacitor may be disconnected from the circuit. As explained above, in these conventional arrangements it is not possible to materially reduce the starting current without greatly reducing the starting torque. In accordance with the present invention, however, the starting current is greatly reduced by connecting the main and auxiliary windings in series for starting in such a manner that the starting torque is not seriously affected, although the current is greatly reduced.

Figure 1:
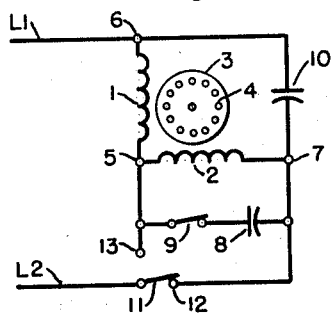
Fig. 1 is a schematic diagram showing one embodiment of the invention.

Fig. 1 shows the invention embodied in a motor of the capacitor-start, capacitor-run type, sometimes called a two-value capacitor motor. As shown in the drawing, such a motor has a main primary winding 1 and an auxiliary primary winding 2 displaced by ninety degrees from each other on the stator of the motor. A secondary member or rotor 3 is also shown which may be of any suitable type and is shown as having a squirrel-cage winding 4. The main winding 1 is shown as being connected between motor terminals 5 and 6, and the auxiliary winding 2 is connected between terminals 5 and 7. A starting capacitor 8 is connected between terminals 5 and 7 by means of a switch 9, and a running capacitor 10 is connected across the terminals 6 and 7. The motor is supplied from a single-phase line L1, L2, the line L1 being connected to the terminal 6, and line L2 being connected to a switch 11. The switch 11 is shown as having a contact 12 connected to the motor terminal 7 and a contact 13 connected to the motor terminal 5.

For starting the motor, the switch 9 is closed and the switch 11 placed on the terminal 12, as shown in Fig. 1. It will be seen that the main and auxiliary windings 1 and 2 are connected in series across the single-phase line, and the starting capacitor 8 is connected across the auxiliary winding 2. The starting capacitor 8 causes the necessary phase displacement between the currents in the main and auxiliary windings, and by proper design of the windings and choice of the capacitor, a starting torque can be obtained which, although less than that of a conventional motor of equivalent rating, is not reduced too greatly and is sufficiently high for most applications. Since the two windings are connected in series across the line, however, rather than in parallel, as in conventional motors, the impedance is quite high and the current is limited by the impedance of the windings and reduced to a very low value, as compared to that of conventional motors. After the motor has accelerated to a sufficient speed, the switch 9 is opened and the switch 11 placed on the contact 13. The windings 1 and 2 are then in parallel across the line with the running capacitor 10 in series with the auxiliary winding 2, and the motor runs as a conventional capacitor motor. It will be understood that the switches 9 and 11 may be operated automatically, in response to speed or otherwise.

It will be seen that a motor is thus provided which has greatly reduced starting current but which has acceptable starting torque. It has been found that with the connection of Fig. 1, a 20 H. P. motor can be built having a starting current less than that of a conventional 10 H. P. motor but with no serious reduction in starting torque. Thus, the field of usefulness of single-phase motors is greatly expanded by permitting the use of larger motors on lines of limited capacity. It will be understood, of course, that the diagram of Fig. 1 is merely schematic and that any suitable switching or control means may be used for effecting the change in connections.

Figure 2:
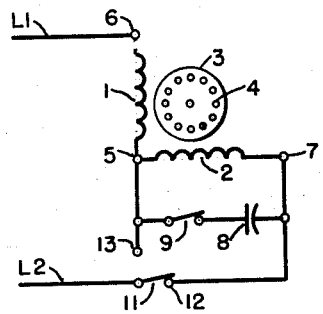
Fig. 2 is a similar diagram showing the invention embodied in another type of capacitor motor.

Fig. 2 shows the invention applied to a motor of the capacitor-start type, sometimes called the capacitor-start induction-run type. The elements of this motor are designated by the same reference numerals as those of Fig. 1, and the circuit of Fig. 2 differs from that of Fig. 1 only in the omission of the running capacitor 10. Fig. 2 shows the starting connection, and it will be seen that it is the same as that of Fig. 1, with the main and auxiliary windings 1 and 2 in series across the line and the starting capacitor 8 connected across the auxiliary winding 2. In the running connection, with the switch 9 open and the switch 11 on the contact 13, the starting capacitor and auxiliary winding are disconnected and the motor runs in the usual manner on the main winding 1 alone. It will be obvious that the effect and advantages of this winding connection are similar to those of Fig. 1, and the connection of Fig. 2 may be used where the characteristics of a capacitor-start type of motor are desired.

Figure 3:
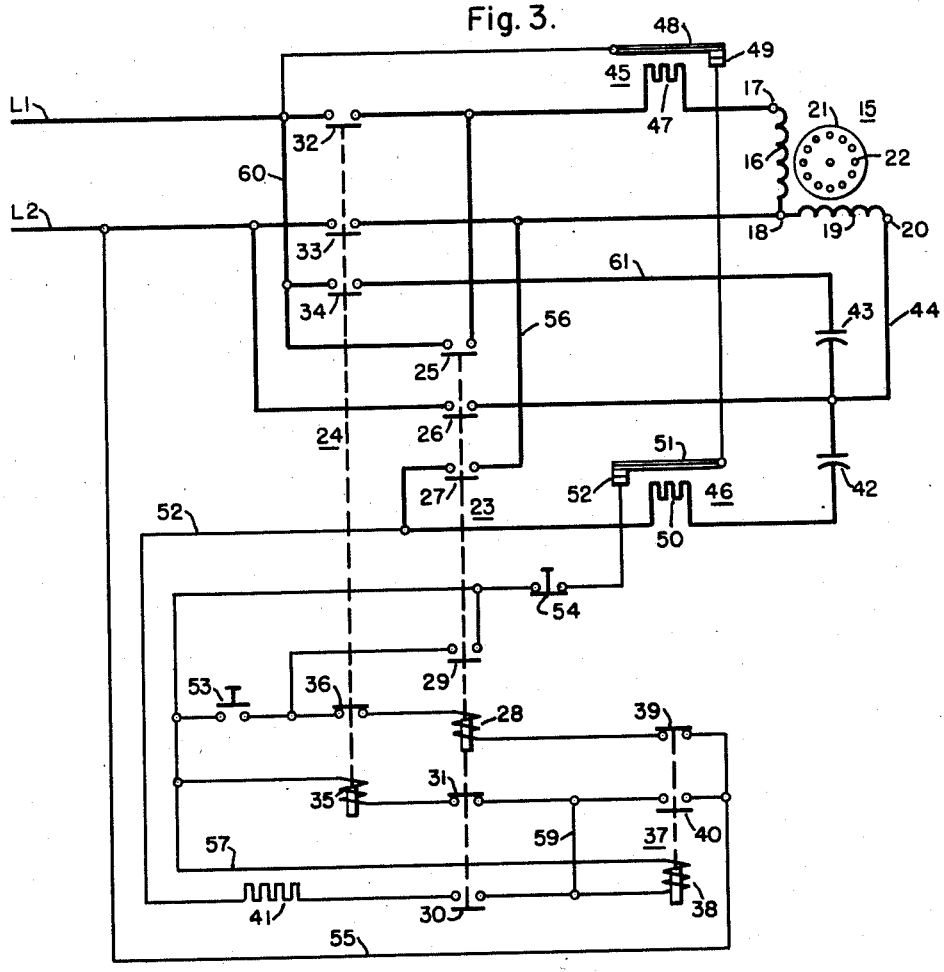
Fig. 3 is a schematic diagram showing a slightly modified form of the embodiment of Fig. 1, together with control means for the motor.

Fig. 3 shows a motor of the same general type as that of Fig. 1 provided with a practical control means for controlling the motor and effecting the necessary changes in connections. The motor 15 shown in this figure has a main primary winding 16 connected between motor terminals 17 and 18, and an auxiliary primary winding 19 connected between motor terminals 18 and 20. The windings 16 and 19 are displaced from each other in the usual manner on the stator of the motor and may be of any suitable or usual type. The motor 15 also has a rotor 21 which is shown as having a squirrel-cage winding 22.

The motor 15 is supplied from a single-phase line L1, L2, and is controlled by a start contactor 23 and a run contactor 24. The start contactor 23 has main contacts 25, 26 and 27, connected as shown, and an operating coil 28. The contactor 23 also has interlock contacts 29 and 30 which are open when the main contacts are open, and an interlock contact 31 which is closed when the main contacts are open. The run contactor 24 has main contacts 32, 33 and 34, connected as shown, and an operating coil 35. The run contactor also has an interlock contact 36 which is closed when the main contacts are open.

Operation of the contactors 23 and 24 is controlled by a relay 37 which controls the energizing circuits of the two contactors. The relay 37 has an operating coil 38, and has a normally-closed contact 39, connected in series with the operating coil 28 of the starting contactor 23, and a normally-open contact 40, connected in series with the operating coil 35 of the run contactor 24 and the interlock contact 31 of the start contactor 23. A resistor 41 is preferably connected in series with the coil 38 of the relay 40.

The motor 15 is provided with a starting capacitor 42, which may be an electrolytic capacitor, and with a running capacitor 43 which may be of any suitable type. The capacitors 42 and 43 are connected to the motor terminal 20 by a conductor 44, and their connections to the motor are controlled by the contact 27 of the start contactor and the contact 34 of the run contactor, respectively.

Protection for the motor is provided by two overload relays 45 and 46. These relays are shown as being of the thermal type, although any suitable type of current-responsive relay having inverse time characteristics might be used. As shown, the relay 45 has a heater 47 connected to carry the current of the main winding 16 and arranged to heat a thermally-responsive element, shown as a bimetallic element 48, which actuates normally-closed contacts 49 connected in a control circuit for the contactors 23 and 24. The overload relay 46 may be similar to the relay 45 and is shown as having a heater 50 connected in series with the starting capacitor 42 and arranged to heat a bimetallic element 51 which actuates normally-closed contacts 52 connected in the control circuit in series with the contacts 49 of the relay 45.

In operation, the motor 15 is started by depressing a start push button 53. When the push button 53 closes, it completes an energizing or control circuit from the line L1 through the closed contacts 49 and 52, a closed stop push button 54, push button 53, closed interlock contact 36, operating coil 28 of contactor 23, closed relay contact 39, and conductor 55 to the line L2. The start contactor 23 is thus energized and closes its main contacts 25, 26 and 27. The contact 25 connects the motor terminal 17 to the line L1, and the contact 26 connects the motor terminal 20 to the line L2. The contact 27 connects the starting capacitor 42 to the motor terminal 18 through conductor 56, so that the capacitor 42 is connected across the auxiliary winding 19 through conductors 44 and 56. It will be seen, therefore, that the motor windings 16 and 19 are connected in series across the line L1, L2 with the starting capacitor across the auxiliary winding, in the manner described above in connection with Figs. 1 and 2. The motor 15, therefore, starts with low starting current and relatively high starting torque.

When the start contactor 23 closes its main contacts, it also closes the interlock contacts 29 and 30 and opens the interlock contact 31. The contact 29 completes a circuit around the start push button 53, so that the push button can be released as soon as the contactor has operated, and the contact 31 interrupts the energizing circuit of the run contactor 24, to prevent any possibility of simultaneous energization of the two contactors. Interlock contact 30 completes an energizing circuit for the relay 37 extending from the line L1 through the closed protective relay contacts 49 and 52, stop push button 54, conductor 57, relay coil 38, interlock contact 30, resistor 41, conductor 58, contact 27, and conductor 56 to the motor terminal 18. Since the motor terminal 17 is connected to the line L1 by the start contactor, the relay coil 38 is thus connected across the main winding 16 and is energized in response to the voltage of the main winding.

In a motor connected as shown and described, the voltage across the main winding rises as the speed of the motor increases and can be taken as a measure of the speed of the motor. The relay 37 is adjusted to operate when the voltage of the main winding 16 reaches a predetermined value corresponding to the desired speed at which the motor connections are to be changed from the starting to the running connection.

When the operating voltage is reached, the relay 37 is actuated to open its contact 39 and close its contact 40. Opening of the contact 39 interrupts the energizing circuit of the coil 28 of the start contactor 23, so that the start contactor opens the main contacts 25, 26 and 27 and the interlock contacts 29 and 30, and closes the interlock contact 31. The interlock contact 31 and relay contact 40 complete an energizing circuit for the run contactor 24 which extends from the line L1 through relay contacts 49 and 52, stop push button 54, run contactor coil 35, interlock contact 31, relay contact 40, and conductor 55 to the line L2. At the same time, the relay contact 40 completes a holding circuit for the relay coil 38 which extends from the line L1 through relay contacts 49 and 52, stop push button 54, conductor 57, coil 38, conductor 59, relay contact 40, and conductor 55 to the line L2. The relay 37 is thus held in its actuated position by the line voltage, the resistor 41 limiting the current through the relay coil during the transition from the motor winding voltage to the higher line voltage.

When the run contactor 24 is energized, it closes its main contacts 32, 33 and 34 and opens the interlock contact 36 in the circuit of the start contactor coil 28. The main contacts 32 and 33 of the run contactor connect the motor terminals 17 and 18 to the line L1, L2, thus connecting the main winding 16 directly across the line. The contact 34 completes a circuit from the line L1 through conductor 60, contact 34, conductor 61, running capacitor 43, and conductor 44 to the motor terminal 20, so that the auxiliary winding 19 is connected across the line in series with the running capacitor 43. The motor is now in its normal running condition. It will be seen that the motor connections are generally similar to those shown in Fig. 1, in that the motor is started with the main and auxiliary windings in series across the line, with the starting capacitor across the auxiliary winding, and runs with both windings in parallel and the running capacitor in series with the auxiliary winding. It is to be noted, however, that the connection differs somewhat from that of Fig. 1, since the running capacitor 43 is not connected to the motor during the starting period.

When the motor 15 is running, it can be stopped by actuating the stop push button 54 which interrupts the energizing circuits of both contactors 23 and 24 and of the relay 37, so that the motor is disconnected from the line. The motor is protected against both starting and running overloads by the protective relays 45 and 46. The contacts 49 and 52 of these relays are also in the energizing circuits of both contactors and of the relay 37, so that operation of either relay 45 or 46 stops the motor. The protective relay 46 is responsive to the current of the starting capacitor 42. This is preferably an electrolytic capacitor and must be protected against carrying an overload current for any considerable length of time during starting of the motor. The relay 46 is therefore set to protect this capacitor, and the starting winding 20, against excessive locked rotor currents or starting overloads. The protective relay 45 responds to the main winding current and is set to protect the motor against running overloads. This relay is not effective during starting because it will necessarily have a longer tripping time than the relay 46 which must operate rapidly to protect the starting capacitor. The relay 46 is not effective during running, since the starting capacitor circuit is open during running. By the use of the two protective relays, complete protection is provided for the motor under both starting and running overload conditions. When the motor is stopped by operation of either of the protective relays, or by the stop push button 54, it can only be restarted by again operating the start push button 53.

As pointed out above, the running capacitor 43 is disconnected from the motor when the run contactor is open, and the starting capacitor 42 is disconnected when the start contactor is open. This is an important advantage of the arrangement shown, since both capacitors are disconnected from the motor windings when the motor is deenergized, and during the transition from the starting to the running connection. This prevents any regenerative braking effect such as occurs in conventional motors when the motor is disconnected from the line with a capacitor still connected to the motor windings. Such a connection results in self-excitation of the motor, causing a regenerative braking action, and may result in high transient torques in the motor shaft or high transient voltages in the motor, both of which are undesirable. By disconnecting both capacitors from the motor windings whenever the motor is disconnected from the line, such self-excitation is prevented.

It should now be apparent that a single-phase motor has been provided in which very low starting currents are obtained, which may be as low as 50% or less of the starting current of a conventional motor of equivalent rating. The starting torque per unit current, however, is relatively high so that even though extremely low starting currents are obtained, the starting torque is not seriously reduced, and acceptable starting torques for most applications are readily obtained. This result is obtained in a simple and inexpensive manner by connecting the motor windings in the manner shown and described. The particular control means shown in Fig. 3 provides a desirable control for a motor of this type, with the advantages described above, and also makes it possible to use standard contactors and relays.

Certain specific embodiments of the invention have been shown and described, for the purpose of illustration, but it will be apparent that other embodiments and modifications are possible and are within the scope of the invention.

We claim as our invention:

1. A single-phase induction motor having relatively rotatable primary and secondary members, a main primary winding and an auxiliary primary winding physically displaced from each other on the primary member, means for connecting said main and auxiliary windings in series to a single-phase line and for connecting a first capacitor across the auxiliary winding for starting, a second capacitor being connected across both windings, and means for disconnecting the first capacitor and connecting the second capacitor in series with the auxiliary winding and for connecting the main and auxiliary windings to the line in parallel for running.

2. A single-phase induction motor having relatively rotatable primary and secondary members, a main primary winding and an auxiliary primary winding physically displaced from each other on the primary member, first contact means for connecting said main and auxiliary windings in series to a single-phase line and for connecting a first capacitor across the auxiliary winding, second contact means for connecting the main and auxiliary windings to the line in parallel and for connecting a second capacitor in series with the auxiliary winding, means for effecting closing of the first contact means for starting the motor, and means responsive to the voltage across the main winding for effecting opening of the first contact means and closing of the second contact means when said voltage exceeds a predetermined value.

3. A single-phase induction motor having relatively rotatable primary and secondary members, a main primary winding and an auxiliary primary winding physically displaced from each other on the primary member, first contact means for connecting said main and auxiliary windings in series to a single-phase line and for connecting a first capacitor across the auxiliary winding, second contact means for connecting the main and auxiliary windings to the line in parallel and for connecting a second capacitor in series with the auxiliary winding, a relay for controlling the operation of both said contact means, means for effecting closing of the first contact means for starting the motor, the first contact means including means for connecting said relay to be responsive to the voltage across the main winding, the relay being connected to effect opening of the first contact means and closing of the second contact means when said voltage exceeds a predetermined value.

4. A single-phase induction motor having relatively rotatable primary and secondary members, a main primary winding and an auxiliary primary winding physically displaced from each other on the primary member, first contact means for connecting said main and auxiliary windings in series to a single-phase line and for connecting a first capacitor across the auxiliary winding, second contact means for connecting the main and auxiliary windings to the line in parallel and for connecting a second capacitor in series with the auxiliary winding, energizing circuits for effecting operation of said first and second contact means, means for completing the energizing circuit of the first contact means to effect closing of the first contact means for starting the motor, means responsive to the voltage across the main winding for effecting opening of the first contact means and closing of the second contact means when said voltage exceeds a predetermined value, and thermally-responsive means actuated in response to the current in said first capacitor for effecting interruption of the energizing circuits of both contact means.

5. A single-phase induction motor having relatively rotatable primary and secondary members, a main primary winding and an auxiliary primary winding physically displaced from each other on the primary member, first contact means for connecting said main and auxiliary windings in series to a single-phase line and for connecting a first capacitor across the auxiliary winding, second contact means for connecting the main and auxiliary windings to the line in parallel and for connecting a second capacitor in series with the auxiliary winding, energizing circuits for effecting operation of said first and second contact means, means for completing the energizing circuit of the first contact means to effect closing of the first contact means for starting the motor, means responsive to the voltage across the main winding for effecting opening of the first contact means and closing of the second contact means when said voltage exceeds a predetermined value, first thermally-responsive means actuated in response to the current in said first capacitor, and second thermally-responsive means actuated in response to the current in the main winding, each of said first and second thermally-responsive means being adapted when actuated to effect interruption of the energizing circuits of both contact means.

References Cited in the file of this patent

FOREIGN PATENTS

| | | |
|---|---|---|
| 764,147 | France | Feb. 26, 1934 |
| 452,379 | Great Britain | Aug. 20, 1936 |